Figure 4:
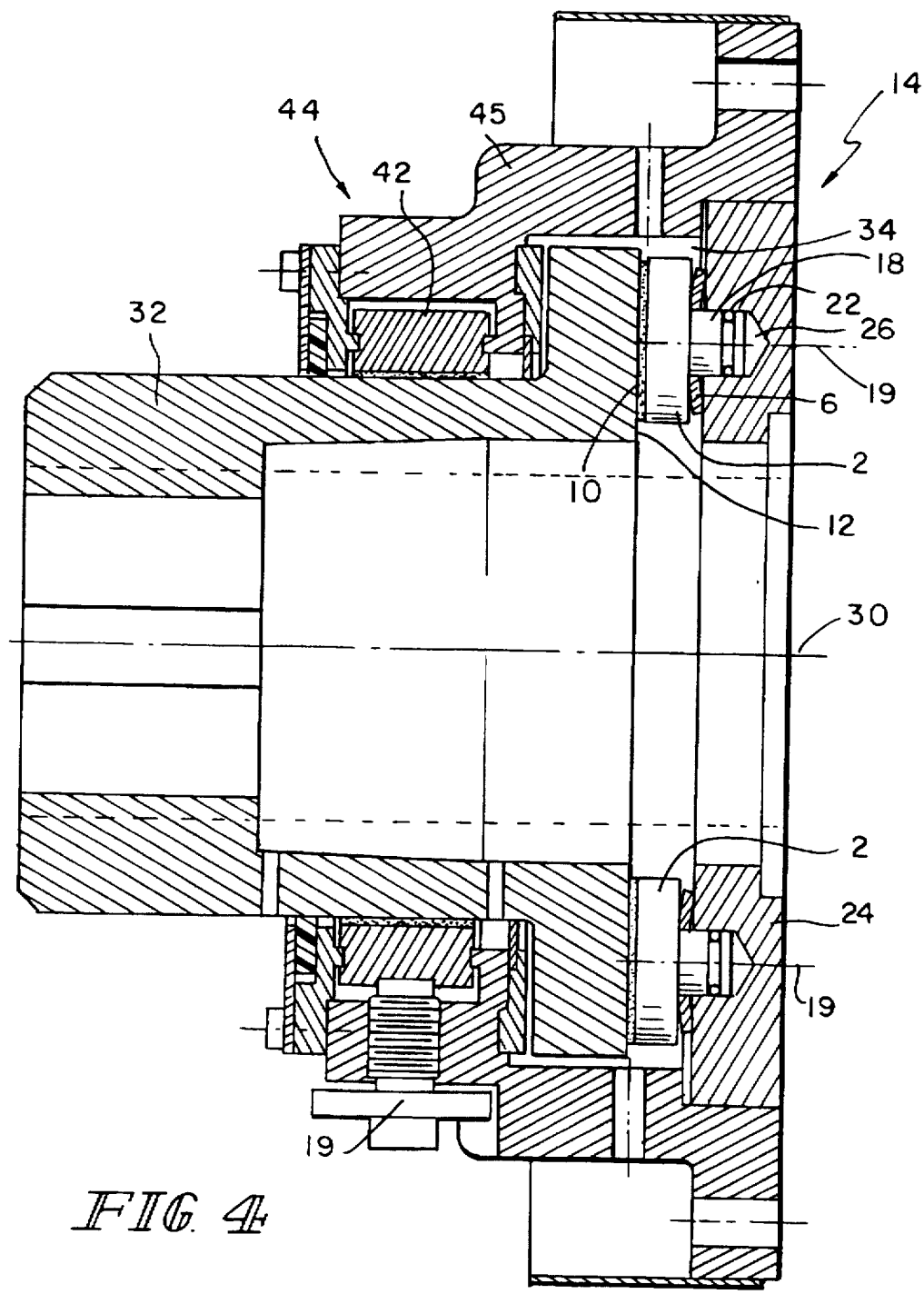

United States Patent [19]
Wyndorps et al.

[11] Patent Number: 5,765,951
[45] Date of Patent: Jun. 16, 1998

[54] PLAIN BEARING SLIDE SHOE WITH COMPRESSION SPRING

[75] Inventors: Paul Wyndorps, Mönchengladbach; Bernd Negwer, Andernach; Albert K. Schmitz, Hemmingen, all of Germany

[73] Assignee: Renk Aktiengesellschaft, Germany

[21] Appl. No.: 691,552

[22] Filed: Aug. 2, 1996

[30] Foreign Application Priority Data

Aug. 2, 1995 [DE] Germany ............ 195 28 339.2

[51] Int. Cl.$^6$ ........................... F16C 17/06
[52] U.S. Cl. ........................... 384/122; 384/124
[58] Field of Search ........................... 384/122, 124, 384/308, 312, 106

[56] References Cited

U.S. PATENT DOCUMENTS

| | | |
|---|---|---|
| 1,117,504 | 11/1914 | Kingsbury . |
| 1,880,353 | 10/1932 | Michell . |
| 3,142,519 | 7/1964 | Abramovitz . |
| 4,240,676 | 12/1980 | Anderson et al. . |
| 5,382,097 | 1/1995 | Ide ........................... 384/122 |

FOREIGN PATENT DOCUMENTS

| | | |
|---|---|---|
| E 19680 B | 8/1986 | Austria . |
| 0080804 | 6/1983 | European Pat. Off. . |
| WO 91/19112 | 12/1991 | European Pat. Off. . |
| WO 95/28574 | 10/1995 | European Pat. Off. . |
| 434151 | 9/1926 | Germany . |
| 667761 | 11/1938 | Germany . |
| 1775557 | 8/1972 | Germany . |
| 2359062 | 5/1974 | Germany . |
| 2626751 | 12/1977 | Germany . |
| 35 22 037 A/1 | 1/1987 | Germany . |
| 43 43 965 A/a | 6/1995 | Germany . |

*Primary Examiner*—Lenard A. Footland
*Attorney, Agent, or Firm*—Barnes & Thornburg

[57] ABSTRACT

An axial plain bearing comprising a plurality of slide shoes (2) which are arranged annularly about a bearing axis of rotation, each slide shoe (2) being provided with an annular peripheral recess (52) on an outer circumference thereof, the annular peripheral recess (52) dividing the slide shoe (2) into a sliding pad (4) provided with a sliding surface (10), and, on an end of the slide shoe (2) opposite the sliding pad (4), a saucerlike compression spring (8) having a diameter greater than the diameter of the sliding pad (4) to protrude radially beyond the sliding pad (4), the sliding pad (4), the saucerlike compression spring (8) and a connecting part (6) connecting the sliding pad (4) and compression spring (8) in the center of the recess (52) together consisting essentially of an integral piece of plastic, the slide shoes (2) being arranged side by side such that the radially protruding compression springs (8) of adjacent slide shoes (2) maintain clearance between sliding pads (4) of said adjacent slide shoes (2).

3 Claims, 2 Drawing Sheets

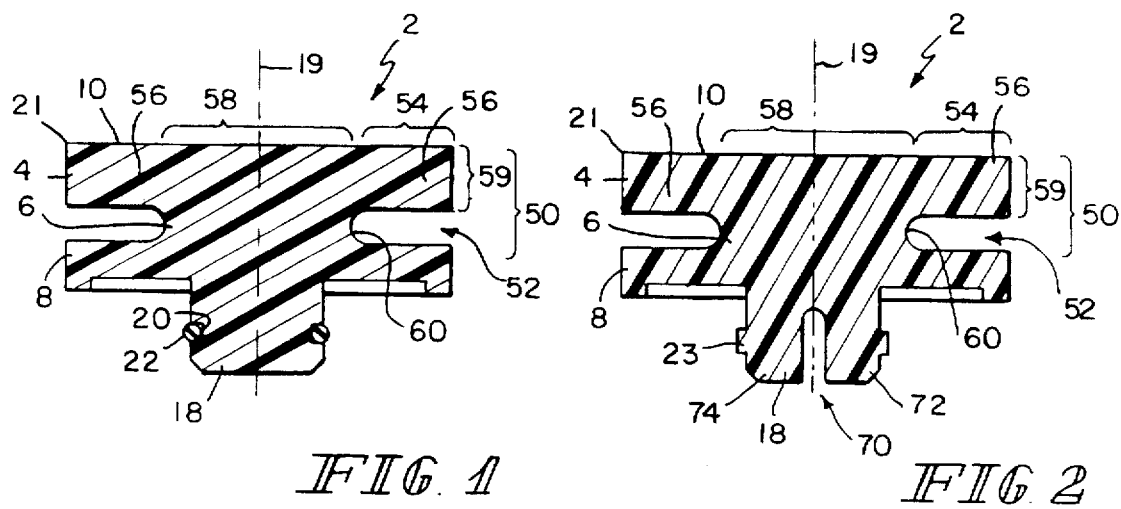
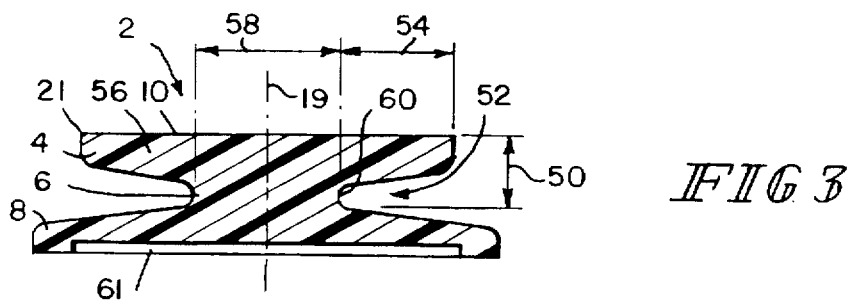
FIG. 1    FIG. 2
FIG. 3

PLAIN BEARING SLIDE SHOE WITH COMPRESSION SPRING

The invention relates to a plain bearing slide shoe with a compression spring.

The plain bearing shoe is suited for axial and radial plain bearings. The preferred area of application is axial plain bearings.

PRIOR ART

DE-A 43 43 965 shows circularly cylindrical slide shoes with a supporting disk spring.

U.S. Pat. No. 1,117,504 shows circularly cylindrical slide shoes with a sliding surface on one end face and a spherical support surface on the other end face.

U.S. Pat. No. 3,142,519 shows segmented slide shoes.

DE-A 35 22 037 shows a radial plain bearing with radially acting tiltable slide shoes.

DESCRIPTION OF THE INVENTION

The objective underlying the invention is to fashion a plain bearing in such a way that it allows a more low-cost manufacture and requires the assembly of fewer parts.

This objective is met according to the invention.

Further features of the invention are contained in the subclaims.

The invention is described hereafter with reference to the drawing with the aid of preferred embodiments, as examples. The drawing shows in:

FIG. 1, schematically an axial section through a circularly cylindrical slide shoe for an axial bearing;

FIG. 2, an axial section through a circularly cylindrical slide shoe for an axial bearing according to a further embodiment of the invention;

FIG. 3, an axial section through a cross-sectionally circular slide shoe for an axial bearing according to a further embodiment of the invention;

FIG. 4, an axial section through a combined axial and radial plain bearing with shoes in the axial bearing part according to one of FIG. 1, 2 or 3.

The slide shoe 2 illustrated in FIG. 1 contains in an integral body of material, preferably plastic, a sliding pad 4, a holder part 6 for the sliding pad 4, a disk-shaped compression spring 8 for equalization of level differences between a sliding surface 10 on one end face of the sliding pad 4 and a trust surface 12 (FIG. 4) opposing it and rotating relative to it, of an axial plain bearing 14, and a pin 18 arranged axially to a slide shoe center axis 19 on the slide shoe side away from the sliding surface 10. The peripheral edge 21 of the sliding surface 10 is smoothed down. Contained in an annular groove 20 of pin 18 is a radially elastic guide ring 22 for pivotal mounting of the slide shoe 2 in a cylindrical opening 26 of a support body 24 of the bearing relative to FIG. 4. In FIG. 4, a plurality of shoes 2 are arranged annularly around a bearing axis of rotation 30. The sliding surfaces 10 of the shoes 2 bear at bearing standstill on the thrust surface 12 which, on a bearing support body 32, is arranged annularly in a plane radially to the bearing axis of rotation 30. As the bearing support body 32 rotates relative to the slide shoes 2 of support body 24 about the bearing axis of rotation 30, lubricant is forced from the lubricant space 34 formed between them, between the sliding surfaces 10 of shoes 2 and the thrust surface 12. As a result, the slide shoes 2 are tilted relative to the bearing axis of rotation 30 from their previously axially parallel position to an inclined position, so that a wedge-shaped lubrication clearance with lubricant is created between the sliding surfaces 10 and the thrust surface 12. Pressure and heat are generated during bearing rotation in the lubrication clearance between sliding surface 10 and thrust surface 12. To safely preclude the creation of a concave shape of the sliding surface 10 by the pressure- and temperature-dependent deformations of the slide shoe, the sliding surface 10 of the shoes 2 is produced with a slight convex crowning of about 10 µm. The size of the crowning and its radius, however, change during bearing operation in contingence on pressure and temperature. In the operation of the bearing, a temperature higher than in the deeper areas of the slide shoe 2 beneath the sliding surface 10 is normally generated in the sliding surface 10.

One of the two support bodies 24 or bearing support body 32 is nonrotatable while the other is rotatable. In the vertical bearing relative to FIG. 4, the support body 24 is nonrotatable and the bearing support body 32 (runner), which can be joined nonrotatably to a shaft, is arranged rotatably.

The invention is described here with reference to the axial plain bearing 14, but it is applicable also to radially acting slide shoes 42 of a radial plain bearing 44. FIG. 4 shows a combination axial plain bearing 14 and radial plain bearing 44, to which the bearing support body 32 and a bearing housing 45 are common.

According to the invention, periphery 50 of the slide shoe is provided with a relief, or peripheral recess, 52 extending annularly around the entire circumference, in a way such that the slide shoe rim area 56 disposed above the recess 52 can with the pertaining rim area 54 of the sliding surface 10 flex toward the peripheral recess 52. This causes a convex augmentation of the crowning of the sliding surface 10 when in the operation of the bearing a temperature higher than beneath, in the interior of the slide shoe 2, is generated on the sliding surface 10. The temperature-dependent convex crowning deformation of the sliding surface 10 begins at the slide shoe center area 58, at the bottom 60 of recess 52. In contrast, a convex crowning of the sliding surface 10 fashioned mechanically in the production can extend across the entire expanse of said sliding surface. The axial thickness 59 of rim section 56 above the peripheral recess 52 is appreciably smaller than the axial thickness 50 of the slide shoe 2 extending axially beyond it, in the center area 58 of the shoe, radially within recess 52. The axial thickness 50 in the center area is in the drawing figures identical with the height of the periphery 50 of the slide shoe 2 containing the sliding pad 4 and holder 6.

The annular peripheral recess 52 provides axial leeway for the disk-shaped compression spring 8, relative to the sliding pad 4.

In the embodiment relative to FIG. 2, the radially elastic guide ring 22 has been replaced by an annular collar 23, integral with the slide shoe 2, on the pin 18. Moreover, pin 18 of FIG. 2 is longitudinally slotted, preferably by a slot 70 which diametrally extends completely through it and axially across more than three-fourths of its length. Pin 18 is thereby split in two (or more) finger type pin sections 72 and 74, which are able to radially flex elastically relative to one another. This elasticity replaces the elasticity of the guide ring 22. The guide ring 22 or the corresponding annular collar 23 are necessary to fix the slide shoe radially and axially within the opening 26 of support body 24 receiving it and to enable it to perform the said tilt movements. In the remaining parts, the slide shoe relative to FIG. 2 is fashioned the same as the slide shoe 2 of FIG. 1, for which reason identical parts are not described here once again.

FIG. 3 shows an integral embodiment which does not have a pin 18 and no guide ring 22 or annular collar 23, which therefore requires positioning in a plain bearing in some other way. As shown in FIG. 3, the peripheral recess 52 can have, radially from the inside outward, an axial height that increases in the form of a wedge, so that the slide shoe rim area 56 and/or the disk-shaped spring 8 have a thickness which decreases radially outwardly in the form of a wedge. This allows a more even distribution of the mechanical bending stress in the sliding pad 4 and/or compression spring 8 when the slide shoe 2 is subjected to load. Material is being saved at the same time. For improvement of the spring effect and to save material as well, the disk-shaped compression spring 8 may be provided on its underside with a recess 61. A further, particular feature of the embodiment relative to FIG. 3 is that the disk spring 8 has a diameter larger than the remaining parts of the slide shoe 2 and, therefore, protrudes radially beyond said remaining parts. Consequently, the sliding pad 4 provided with the sliding surface 10 has a larger clearance to the adjacent slide shoes 2, which facilitates the supply and removal of lubricant and, thereby, improves the cooling. Moreover, the protruding compression spring 8 can keep adjacent slide shoes spaced from the sliding pad 4, allowing the latter to perform the said tilt or pivotal movements relative to the compression spring 8, without being disturbed by adjacent slide shoes 2.

The sliding surface 10 may be a thin layer of a known material other than that of the remaining parts of the slide shoe 2, which is applied on the sliding pad 4 of shoe 2. Such additional layer for the sliding surface 10 is not required, however, when the slide shoe 2 overall, or at least its sliding pad 4, consists of plastic material, which possesses good sliding properties. Said layer must consist of a material with good sliding properties, for example, of plastic of babbitt metal.

The sliding pad 4 of slide shoe 2 may be a separate part that is joined to the other parts 6, 8 and 18 of the slide shoe 2 or bears on them in axial direction. However, the preferred embodiment, as illustrated in the drawing figures, when also the sliding pad 4 is an integral component of the other parts of the slide shoe.

We claim:

1. An axial plain bearing comprising a plurality of slide shoes (2) which are arranged annularly about a bearing axis of rotation, each slide shoe (2) being provided with an annular peripheral recess (52) on an outer circumference thereof, the annular peripheral recess (52) dividing the slide shoe (2) into a sliding pad (4) provided with a sliding surface (10), and, on an end of the slide shoe (2) opposite the sliding pad (4), a saucerlike compression spring (8) having a diameter greater than the diameter of the sliding pad (4) to protrude radially beyond the sliding pad (4), the sliding pad (4), the saucerlike compression spring (8) and a connecting part (6) connecting the sliding pad (4) and compression spring (8) in the center of the recess (52) together consisting essentially of an integral piece of plastic, the slide shoes (2) being arranged side by side such that the radially protruding compression springs (8) of adjacent slide shoes (2) maintain clearance between sliding pads (4) of said adjacent slide shoes (2).

2. An axial plain bearing according to claim 1 wherein the plastic forms the sliding surface (10) of the slide shoes (2) and exhibits lubricity.

3. Axial plain bearing according to claim 1 wherein the sliding surface (10) consists essentially of a thin layer of a material other than the integral piece of plastic applied on the sliding pad (4).

* * * * *